United States Patent [19]

Yang

[11] Patent Number: 5,922,999
[45] Date of Patent: Jul. 13, 1999

[54] PORTABLE SCALE FOR FISHING PURPOSES

[76] Inventor: Ah Mi Yang, P.O. Box 63-69, Taichung, Taiwan

[21] Appl. No.: 09/097,567

[22] Filed: Jun. 15, 1998

[51] Int. Cl.[6] ............................. G01G 19/56; G01G 3/02
[52] U.S. Cl. ......................... 177/148; 177/168; 177/169; 177/232; 177/233; 73/1.13
[58] Field of Search ................................... 177/126, 127, 177/128, 148, 149, 168, 169, 170, 232, 233; 73/1.13

[56] References Cited

U.S. PATENT DOCUMENTS

| | | | |
|---|---|---|---|
| 264,070 | 9/1882 | Forschner | 177/232 |
| 452,278 | 5/1891 | McIlaine | 177/149 |
| 465,246 | 12/1891 | Day | 177/232 |
| 479,718 | 7/1892 | Morgan et al. | 177/233 |
| 531,886 | 1/1895 | Wheeler | 177/149 |
| 756,175 | 3/1904 | Meisselbach et al. | 177/232 |
| 917,169 | 4/1909 | Sherman | 177/232 |
| 952,552 | 3/1910 | Weldon | 177/232 |
| 1,215,594 | 2/1917 | Walker | 177/233 |
| 1,255,269 | 2/1918 | Zinkiewiez | 177/232 |
| 2,603,474 | 7/1952 | Mandolf et al. | 177/233 |
| 4,765,420 | 8/1988 | Mengo | 177/233 |
| 4,785,897 | 11/1988 | Keinert, Jr. | 177/232 |
| 4,964,479 | 10/1990 | Sumida | 177/233 |
| 4,995,188 | 2/1991 | Ewing | 177/232 |
| 5,031,710 | 7/1991 | Parker et al. | 177/232 |
| 5,637,838 | 6/1997 | Arey et al. | 177/148 |

*Primary Examiner*—Randy W. Gibson

[57] ABSTRACT

A scale includes a housing having a graduation disposed beside a groove and a casing secured on the housing for receiving a band tape. A slide is slidably received in the housing and has a projection slidably engaged in the groove for indicating the graduation. A hook is secured to the slide for hooking an object to be weighed. A spring is coupled between the slide and the housing for allowing the projection to be moved along the groove and for weighting the object. A calibrating device may be used for calibrating the scale.

4 Claims, 3 Drawing Sheets

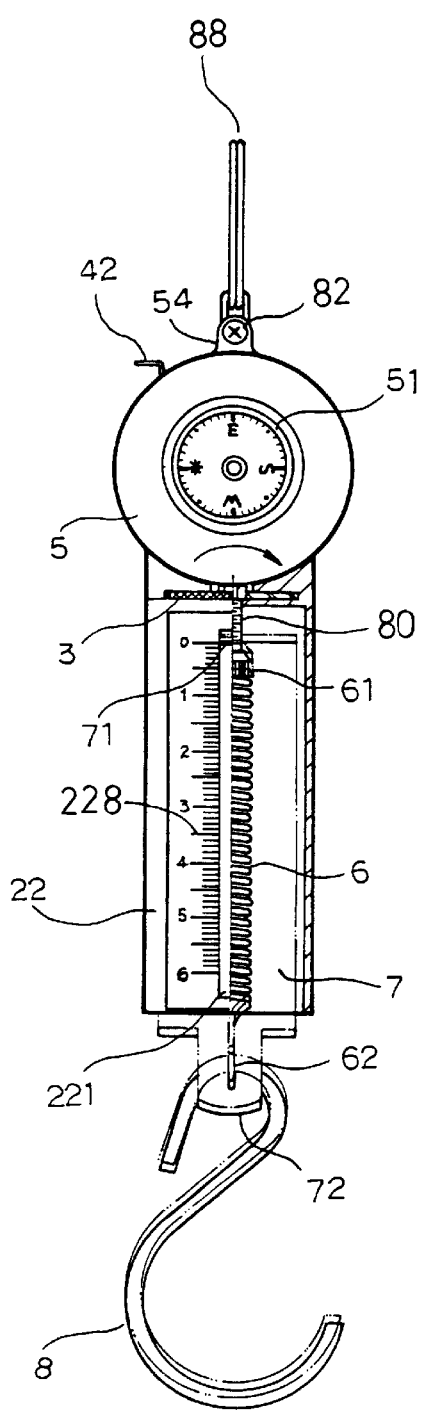
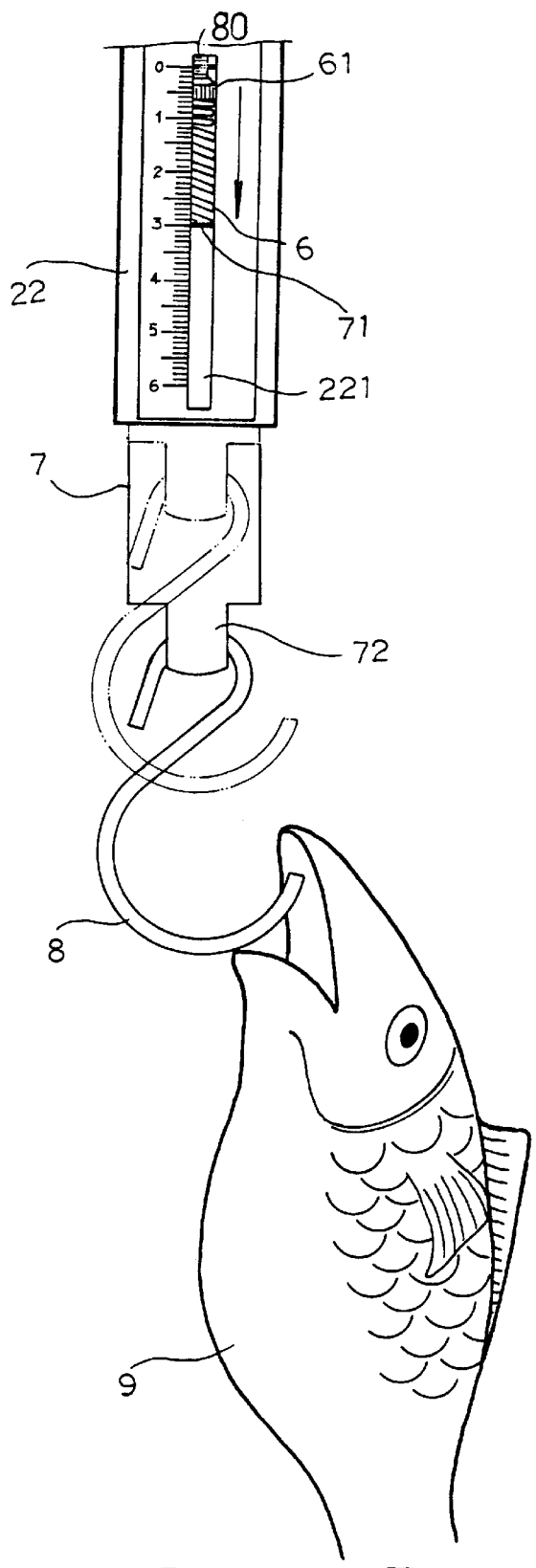
FIG. 4
FIG. 5

PORTABLE SCALE FOR FISHING PURPOSES

BACKGROUND OF THE INVENTION

1. Field of the Invention

The present invention relates to a portable scale, and more particularly to a portable scale for weighting or for measuring the sizes of the fishes.

2. Description of the Prior Art

Typically, people have to estimate the sizes and the weights of the fishes after the fishes are caught. It is normally required to let go the fishes that include a size or a weight no more than a predetermined value. However, people may not precisely measure the sizes and the weights of the fishes.

The present invention has arisen to mitigate and/or obviate the afore-described disadvantages of the conventional fishing problems.

SUMMARY OF THE INVENTION

The primary objective of the present invention is to provide a portable scale which may be used for easily measuring the sizes and for weighing the fishes.

In accordance with one aspect of the invention, there is provided a scale comprising a housing including at least one groove formed therein and including an upper portion having a casing secured thereon, the housing including a graduation provided beside the groove, a band tape received in the casing, a slide slidably received in the housing and including a bottom portion and including at least one projection slidably engaged in the groove of the housing for indicating the graduation of the housing, a hook secured to the bottom portion of the slide for engaging with an object to be weighed, and a spring coupled between the slide and the housing for allowing the slide to be moved relative to the housing when the object is hooked to the hook, and for allowing the projection to be moved along the groove of the housing for weighting the object.

A cover is further provided and secured to the casing for shielding the band tape. The casing includes a slit, the band tape includes a coil body received in the casing and includes a hand grip extended outward of the casing via the slit and includes a center secured to the cover.

A calibrating means is further provided for calibrating the projection relative to the graduation of the housing. The spring includes a first end secured to the slide and includes a second end having a head, the calibrating means includes a bolt rotatably secured to the housing and threadedly engaged with the head for allowing the head to be adjusted relative to the housing, and means for rotating the head of the spring to adjust the head of the spring relative to the head and to adjust the projection relative to the graduation. The housing includes a slot formed between the housing and the casing, the rotating means includes a knob rotatably received in the slot of the housing and secured to the bolt for allowing the knob to rotate the bolt.

Further objectives and advantages of the present invention will become apparent from a careful reading of a detailed description provided hereinbelow, with appropriate reference to accompanying drawings.

BRIEF DESCRIPTION OF THE DRAWINGS

FIG. 4 is a plan view of the portable scale; and

FIG. 5 is a schematic view illustrating the operation of the portable scale.

DETAILED DESCRIPTION OF THE PREFERRED EMBODIMENT

Figure 1:
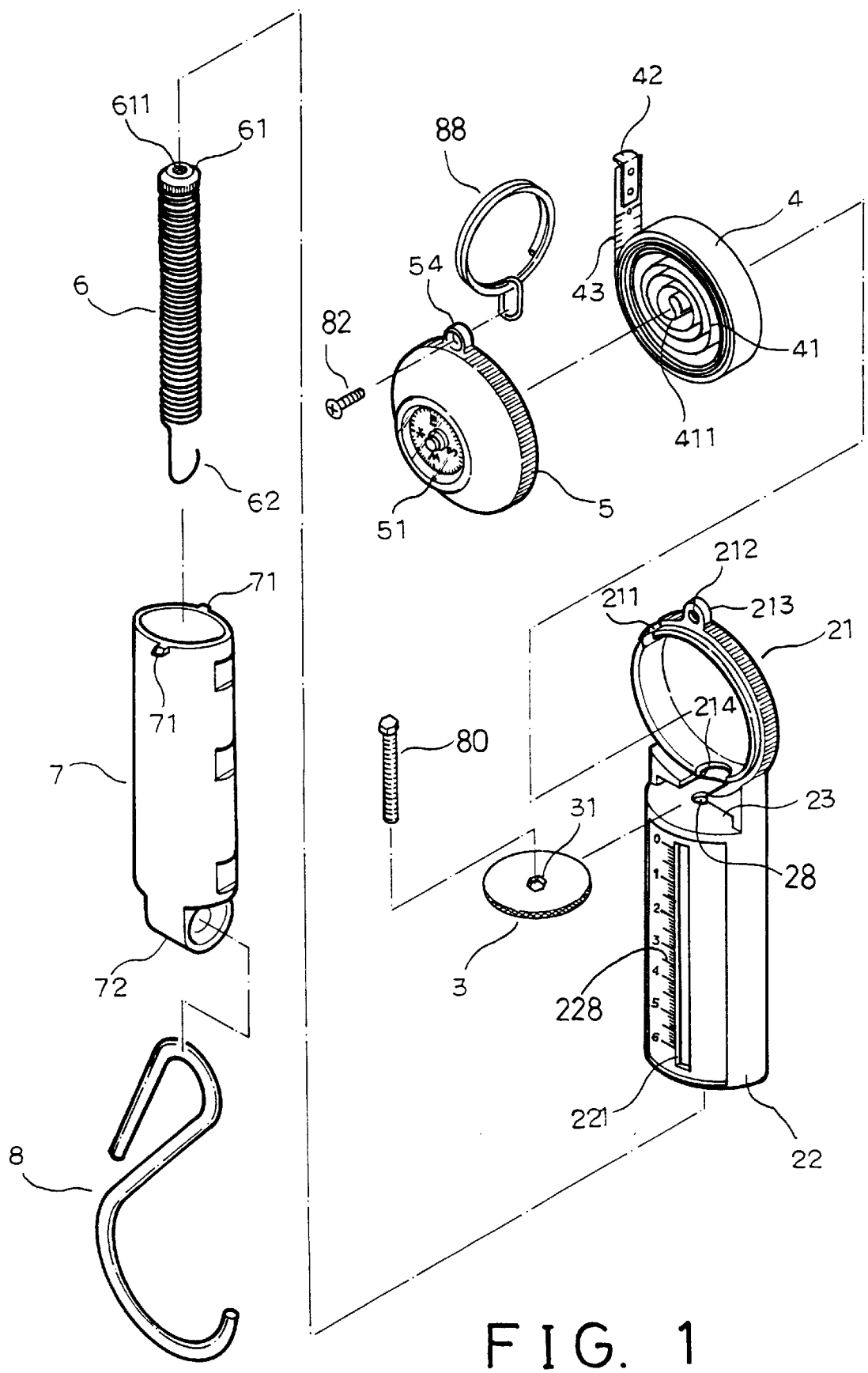
FIG. 1 is an exploded view of a portable scale in accordance with the present invention.
Figures 2, 3:
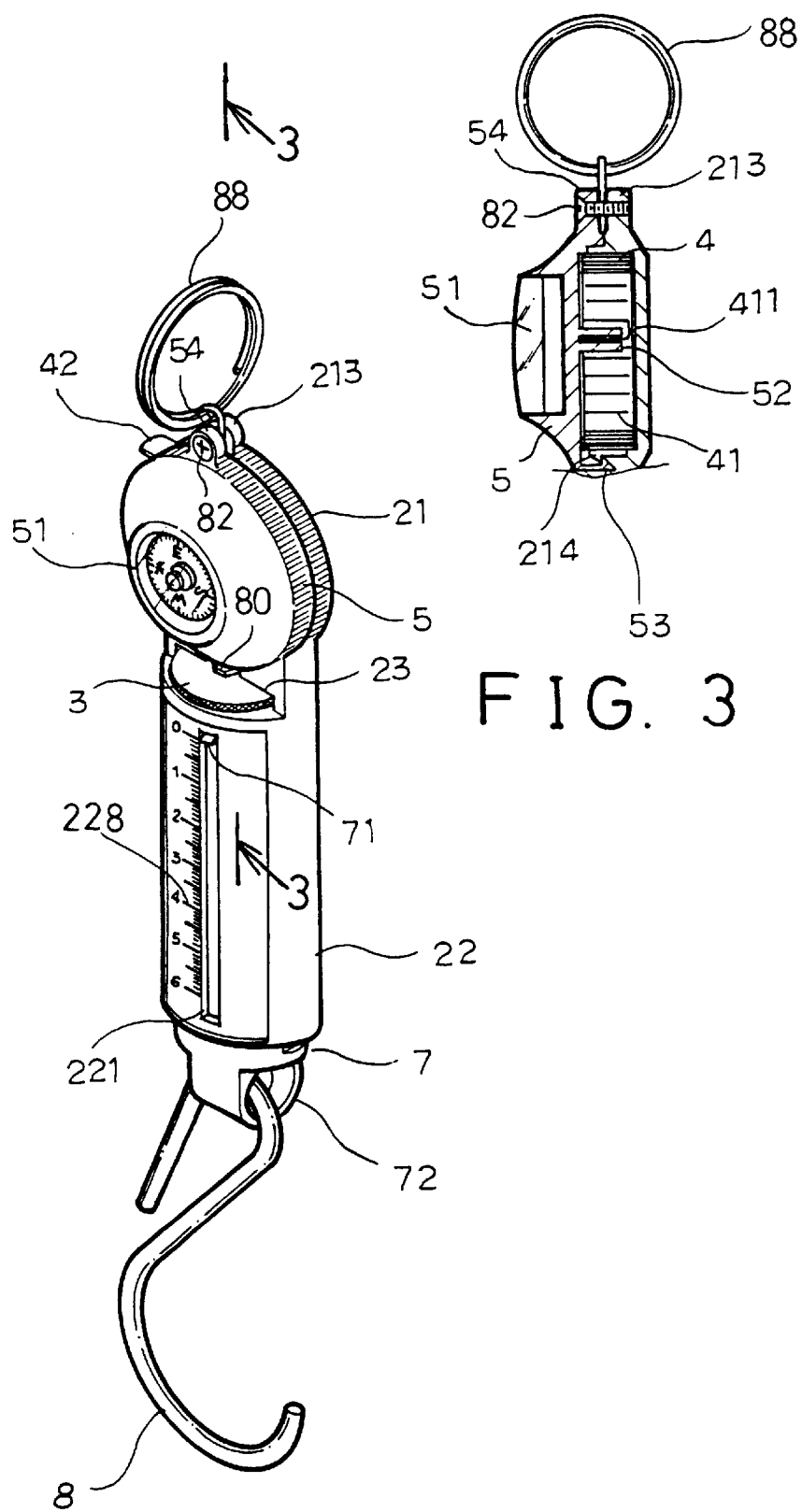
FIG. 2 is a perspective view of the portable scale.
FIG. 3 is a partial cross sectional view taken along lines 3—3 of FIG. 2.

Referring to the drawings, and initially to FIGS. 1–4, a portable scale in accordance with the present invention comprises a housing 22, and a circular casing 21 secured on top of the housing 22. The housing 22 includes one or more grooves 221 and a graduation 228 provided beside one of the grooves 221. A slot 23 is formed between the housing 22 and the casing 21 for rotatably receiving a knob 3. The knob 3 includes a non-circular center hole 31, such as a hexagonal hole 31 for receiving the head of a bolt 80. The bolt 80 may be secured to the knob 3 by force-fitted engagement or by adhesive materials, such that the bolt 80 may be rotated by the knob 3. The housing 22 includes a hole 28 formed in top for receiving the bolt 80. The casing 21 includes a slit 211 and includes an ear 213 having a puncture 212 for engaging with a band, and includes a hook 214 formed in the bottom (FIGS. 1, 3).

A band tape 4 includes a coil body 41 received in the casing 21 and includes a hand grip 42 extended outward of the casing 21 via the slit 211 and includes a graduation 43 for measuring the sizes of the fishes. A cover 5 includes an ear 54 secured to the ear 213 of the casing 21 by a fastener 82 and includes a hook 53 extended from the bottom portion (FIG. 3) for engaging with the hook 214 of the casing 21 and for securing the cover 5 to the casing 21 and for shielding the band tape 4. A ring 88 may be secured to the casing 21 and the cover 5 by the fastener 82. The cover 5 includes a hub 52 (FIG. 3) for securing the center 411 of the coil body 41 of the band tape 4, and includes a compass 51.

A slide 7 is slidably received in the housing 22 and includes a pair of opposite projections 71 slidably engaged in the grooves 221 of the housing 22 for guiding the slide 7 to move up and down along the housing 22. The slide 7 includes a bottom portion 72 for engaging with a hook 8 which may be used for hooking the fish 9 to be measured (FIG. 5). A spring 6 includes a head 61 secured on top and having a screw hole 611 for threadedly engaging with the bolt 80, and includes a lower end 62 secured to the slide 7 and/or the hook 8 (FIG. 4) for resiliently coupling the slide 7 and the hook 8 to the bolt 80 and the housing 22.

In operation, as shown in FIG. 5, when the hook 8 is hooked to the fish 9, the slide 7 will be moved downward against the spring 6. The projection(s) 71 of the slide 7 may be aligned with the graduation 228 for indicating the weight of the fish 9. When the bolt 80 is rotated by the knob 3, the head 61 of the spring 6 may be adjusted up and down along the bolt 80 in order to adjust the projections 71 along the grooves 221 in order to calibrate the scale.

Accordingly, the portable scale in accordance with the present invention may be used for easily measuring the sizes and for weighing the fishes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A scale comprising:

a housing including at least one groove formed therein and including an upper portion having a casing secured thereon, said housing including a graduation provided beside said at least one groove, a band tape received in said casing, a slide slidably received in said housing and including a bottom portion and including at least one projection slidably engaged in said at least one groove of said housing for indicating said graduation of said housing, a hook secured to said bottom portion of said slide for engaging with an object to be weighed, a spring coupled between said slide and said housing for allowing said slide to be moved relative to said housing when the object is booked to said hook, and for allowing said at least one projection to be moved along said at least one groove of said housing for weighting the object, said spring including a first end secured to said slide and including a second end having a head, and means for calibrating said at least one projection relative to said graduation of said housing, said calibrating means including a bolt rotatably secured to said housing and threadedly engaged with said head of said spring for allowing said head of said spring to be adjusted relative to said housing, and means for rotating said head of said spring to adjust said head of said spring relative to said bolt and to adjust said at least one projection relative to said graduation.

2. The scale according to claim 1 further comprising a cover, and means for securing said cover to said casing for shielding said band tape.

3. The scale according to claim 2, wherein said casing includes a slit, said band tape includes a coil body received in said casing and includes a hand grip extended outward of said casing via said slit and includes a center secured to said color.

4. The scale according to claim 1, wherein said housing includes a slot formed between said housing and said casing, said rotating means includes a knob rotatably received in said slot of said housing and secured to said bolt for allowing said knob to rotate said bolt.

\* \* \* \* \*

UNITED STATES PATENT AND TRADEMARK OFFICE
CERTIFICATE OF CORRECTION

PATENT NO. : 5,922,999
DATED : July 13, 1999
INVENTOR(S) : Ah Mi Yang

It is certified that error appears in the above-identified patent and that said Letters Patent is hereby corrected as shown below:

On the title page item [76], should read --P.O. Box 63-99
                                                     Taichung, Taiwan--.

Signed and Sealed this

Seventh Day of December, 1999

*Attest:*

Q. TODD DICKINSON

*Attesting Officer*                *Acting Commissioner of Patents and Trademarks*